(12) United States Patent
Yokoyama et al.

(10) Patent No.: US 11,797,025 B2
(45) Date of Patent: Oct. 24, 2023

(54) AUTONOMOUS WORK SYSTEM, AUTONOMOUS WORK SETTING METHOD, AND STORAGE MEDIUM

(71) Applicant: HONDA MOTOR CO., LTD., Tokyo (JP)

(72) Inventors: Taro Yokoyama, Wako (JP); Hiroto Takahashi, Wako (JP); Toshiaki Kawakami, Wako (JP); Wei Song, Wako (JP); Takuya Kanisawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 178 days.

(21) Appl. No.: 17/209,283

(22) Filed: Mar. 23, 2021

(65) Prior Publication Data
US 2021/0302999 A1    Sep. 30, 2021

(30) Foreign Application Priority Data

Mar. 31, 2020  (JP) ................................. 2020-064239

(51) Int. Cl.
*G05D 1/02*     (2020.01)
*H04W 4/46*    (2018.01)
(Continued)

(52) U.S. Cl.
CPC ......... *G05D 1/0287* (2013.01); *G05D 1/0088* (2013.01); *G06V 20/56* (2022.01);
(Continued)

(58) Field of Classification Search
CPC .... G05B 15/02; G05D 1/0088; G05D 1/0274; G05D 1/0276; G05D 1/0287;
(Continued)

(56) References Cited

U.S. PATENT DOCUMENTS

2001/0047231 A1* 11/2001 Peless .................. A01D 34/008
                                                                                  701/23
2006/0015229 A1*  1/2006 Lange ...................... B62D 1/00
                                                                                  701/41
(Continued)

FOREIGN PATENT DOCUMENTS

| JP | 2018-108034 | 7/2018 |
| JP | 6564202 | 8/2019 |
| WO | 2018/116486 | 6/2018 |

OTHER PUBLICATIONS

Japanese Notice of Allowance for Japanese Patent Application No. 2020-064239 dated May 23, 2023.

*Primary Examiner* — Hunter B Lonsberry
*Assistant Examiner* — Matthew J. Reda
(74) *Attorney, Agent, or Firm* — AMIN, TUROCY & WATSON, LLP

(57) ABSTRACT

An autonomous work system includes a first work machine, a plurality of second work machines having different functions, a setting device that stores work schedule information indicating work schedule content, performance of the first work machine, and performance of the plurality of second work machines, and a terminal. The first work machine acquires a state of work performed by its own device and transmits detection result information indicating the acquired state of work to the setting device. The setting device discriminates whether additional work is required based on the detection result information and the work schedule information, and in a case where the additional work is required, selects the second work machine, and transmits additional work information including work content for the second work machine and information relating to the second work machine to at least one of the terminal and the second work machine.

6 Claims, 10 Drawing Sheets

(51) Int. Cl.
  *G05D 1/00* (2006.01)
  *G06V 20/56* (2022.01)
  *G05B 15/02* (2006.01)
  *G06Q 10/0631* (2023.01)

(52) U.S. Cl.
  CPC .............. *H04W 4/46* (2018.02); *G05B 15/02* (2013.01); *G05D 2201/0201* (2013.01); *G06Q 10/06316* (2013.01)

(58) Field of Classification Search
  CPC ... G05D 2201/0201; G05D 2201/0208; G06Q 10/06316; G06V 20/56; H04W 4/30; H04W 4/46
  See application file for complete search history.

(56) References Cited

U.S. PATENT DOCUMENTS

| | | | |
|---|---|---|---|
| 2012/0296545 A1* | 11/2012 | Cooper | B61L 15/0036 701/99 |
| 2015/0005963 A1* | 1/2015 | Endrizzi | G05B 15/02 700/284 |
| 2016/0054733 A1* | 2/2016 | Hollida | H04N 7/185 701/2 |
| 2018/0338408 A1 | 11/2018 | Shinkai et al. | |
| 2019/0196483 A1 | 6/2019 | Uemura et al. | |
| 2019/0361434 A1* | 11/2019 | Ohtsuji | G05D 1/0027 |
| 2019/0382004 A1* | 12/2019 | Golov | B60W 60/001 |
| 2020/0064869 A1* | 2/2020 | Pickett | B64C 39/024 |
| 2020/0128785 A1* | 4/2020 | Bassett | A01K 1/105 |
| 2020/0150647 A1 | 5/2020 | Haneda et al. | |
| 2020/0225673 A1* | 7/2020 | Ebrahimi Afrouzi | G05D 1/0044 |
| 2021/0227752 A1* | 7/2021 | Zanini | B25J 9/1679 |
| 2022/0124980 A1* | 4/2022 | Lorentzen | G06N 3/04 |

* cited by examiner

3a

3b

AUTONOMOUS WORK SYSTEM, AUTONOMOUS WORK SETTING METHOD, AND STORAGE MEDIUM

CROSS-REFERENCE TO RELATED APPLICATION

Priority is claimed on Japanese Patent Application No. 2020-064239, filed Mar. 31, 2020, the content of which is incorporated herein by reference.

BACKGROUND OF THE INVENTION

Field of the Invention

The present invention relates to an autonomous work system, an autonomous work setting method, and a storage medium.

Description of Related Art

It has been proposed to divide a predetermined work area and allow a plurality of work machines that autonomously perform work to perform work such as cleaning or lawn mowing (see, for example, Japanese Patent No. 6564202).

Since the past, in a case where a worker performs work when mowing the lawn of a park or the like, workers have communicated verbally with other workers or have seen motions of other workers to understand necessary work.

Alternatively, in a case where an autonomous work machine is allowed to perform main work when mowing the lawn of a park or the like, a worker has looked around after the work of the autonomous work machine and has confirmed whether additional work is necessary.

SUMMARY OF THE INVENTION

However, in a case where an autonomous work machine is allowed to perform main work when mowing the lawn of a park or the like, procedures and methods are different from those in work performed by persons, and thus it has become difficult to understand the content of work to be shared. As the number of persons decreases with automation, it has also become difficult to perform work while monitoring the behavior of automatic machines.

The present invention was contrived in view of the above problem, and an object thereof is to provide an autonomous work system, an autonomous work setting method, and a storage medium that make it possible to perform work efficiently even in a case where an autonomous work machine is used.

In order to solve the above problem and achieve such an object, the present invention adopts the following aspects.

(1) According to an aspect of the present invention, there is provided an autonomous work system including: a first work machine configured to have a communication unit; a plurality of second work machines having different functions configured to have communication units; a setting device configured to store work schedule information indicating work schedule content, performance of the first work machine, and performance of the plurality of second work machines and to have a communication unit; and a terminal configured to have a communication unit and a notification unit, wherein the first work machine acquires a state of work performed by the host device and transmits detection result information indicating the acquired state of work to the setting device, and the setting device discriminates whether additional work is required on the basis of the detection result information received from the first work machine and the work schedule information, and in a case where the additional work is required, selects the second work machine appropriate for the additional work from the plurality of second work machines on the basis of the performance of the plurality of second work machines, and transmits additional work information including work content for the second work machine and information relating to the second work machine to at least one of the terminal and the second work machine.

(2) According to an aspect of the present invention, there is provided an autonomous work system including: a first work machine configured to store work schedule information indicating work schedule content, performance of its own device, and performance of a plurality of second work machines and to have a communication unit; a second work machine configured to have a communication unit; a setting device configured to have a communication unit; and a terminal configured to have a communication unit and a notification unit, wherein the first work machine acquires a state of work performed by the host device and discriminates whether additional work is required on the basis of detection result information indicating the acquired state of work and the work schedule information, and in a case where the additional work is required, selects the second work machine appropriate for the additional work from the plurality of second work machines on the basis of the performance of the plurality of second work machines, and transmits additional work information including work content for the second work machine and information relating to the selected second work machine to the setting device, and the setting device transmits the received additional work information to at least one of the terminal and the second work machine.

(3) According to an aspect of the present invention, there is provided an autonomous work system including: a first work machine configured to store work schedule information indicating work schedule content, performance of its own device, and performance of a plurality of second work machines and to have a communication unit; a second work machine configured to have a communication unit; a terminal configured to have a communication unit and a notification unit, wherein the first work machine acquires a state of work performed by the host device and discriminates whether additional work is required on the basis of detection result information indicating the acquired state of work and the work schedule information, and in a case where the additional work is required, selects the second work machine appropriate for the additional work from the plurality of second work machines on the basis of the performance of the plurality of second work machines, and transmits additional work information including work content for the second work machine and information relating to the selected second work machine to at least one of the terminal and the second work machine.

(4) In the above aspect (1) or (2), the first work machine and the setting device may share the work schedule information, and the first work machine may acquire at least one of content of completed work and content of work that has not been performed with respect to the work schedule information on the basis of the work schedule information and the detection result information.

(5) According to an aspect of the present invention, there is provided an autonomous work setting method in an autonomous work system including a first work machine configured to have a communication unit, a plurality of second work machines having different functions configured to have communication units, a setting device configured to have a communication unit, and a terminal configured to have a communication unit, the method including: acquiring detection result information indicating a state of work performed by the first work machine from the first work machine; discriminating whether additional work is required on the basis of work schedule information indicating work schedule content and the acquired detection result information; selecting the second work machine appropriate for the additional work from the plurality of second work machines on the basis of performance of the plurality of second work machines in a case where the additional work is required; and transmitting additional work information including work content for the second work machine and information relating to the selected second work machine to at least one of the terminal and the second work machine.

(6) According to an aspect of the present invention, there is provided a program causing a computer to: acquire detection result information indicating a state of work performed by a first work machine from the first work machine; discriminate whether additional work is required on the basis of work schedule information indicating work schedule content and the acquired detection result information; select the second work machine appropriate for the additional work from a plurality of second work machines on the basis of performance of the plurality of second work machines in a case where the additional work is required; and transmit additional work information including work content for the second work machine and information relating to the selected second work machine to at least one of a terminal having a communication unit and the second work machine.

According to the above aspects (1) to (6), it is possible to discriminate whether additional work is required by acquiring the work content of the work machine. Thereby, according to the above aspects (1) to (6), it is possible to detect work left behind by the work machine and to perform work efficiently.

According to the above aspect (1), as the number of work machines increases, the cost of the whole system becomes more inexpensive and information is also collected, so that it is possible to obtain the effect of enabling more appropriate allocation.

According to the above aspect (2), since the load of an installation device can be reduced, it is possible to obtain the effect of enabling the system to be inexpensive.

DETAILED DESCRIPTION OF THE INVENTION

Figure 1:
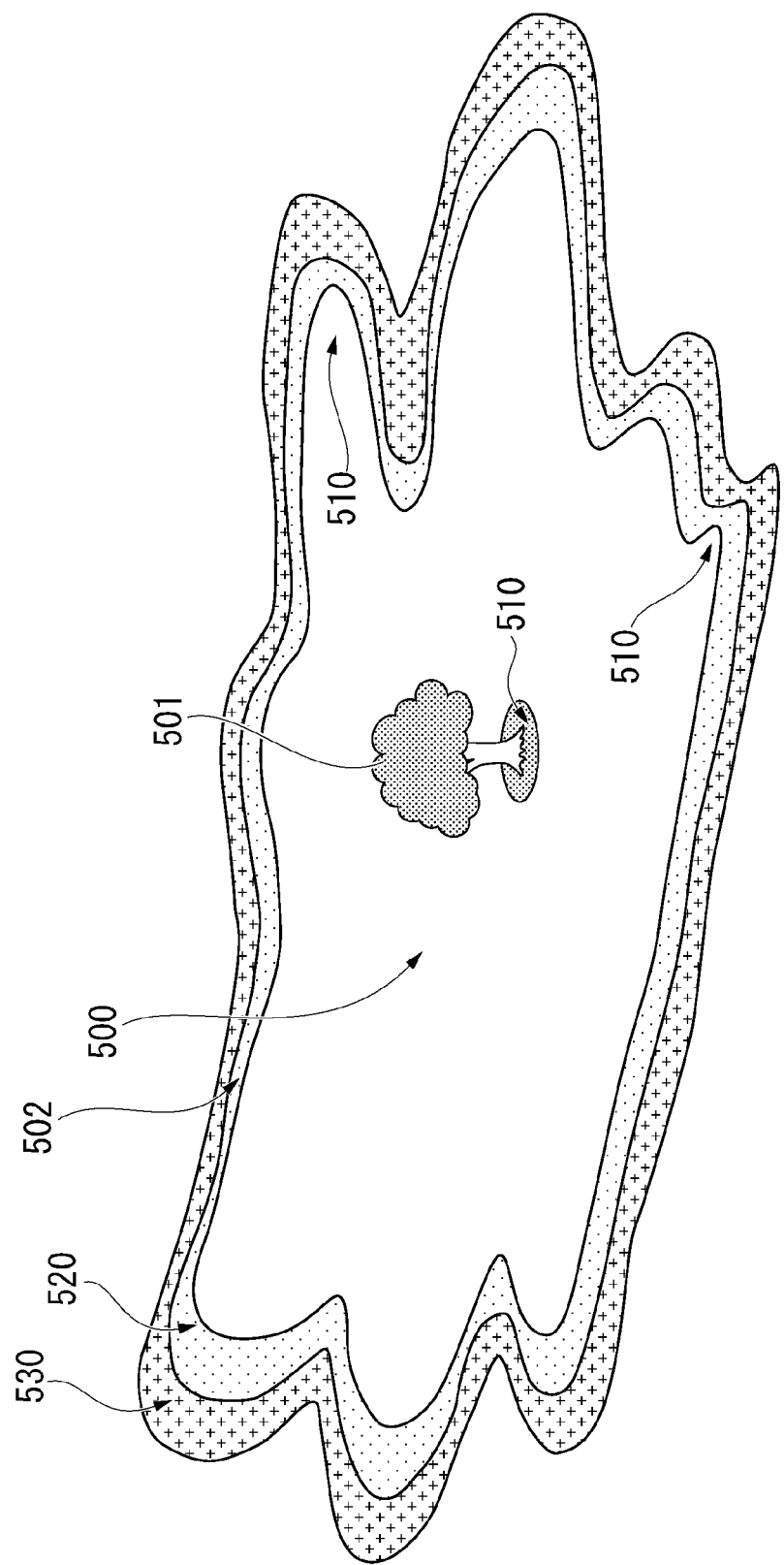
FIG. 1 is a diagram illustrating an example of a work area.

Hereinafter, embodiments of the present invention will be described with reference to the accompanying drawings. In the drawings used in the following description, the scale of each member is appropriately changed in order to make each member recognizable.

<Description of Work Area>

First, an example of a work area will be described.

In the following embodiment, as an example of an autonomous work machine 2, an example in which the autonomous work machine 2 is a lawn mower will be described. The autonomous work machine 2 may not perform work such as, for example, blowing mowed grass scattered on a sidewalk into a work area 500 and mowing the lawn at the edge by the host device.

FIG. 1 is a diagram illustrating an example of the work area 500. The work area 500 (inclusive of a second area 520) is, for example, a park. As shown in FIG. 1, the work area 500 is formed in a horizontally long shape, and has a shape with irregularities in a longitudinal direction. A tree 501 is planted in the center of the work area 500.

An edge 502 is a boundary between the lawn within the work area 500 and the outside of the work area (for example, a sidewalk).

A first area 510 is an example of an area in which the autonomous work machine 2 of the present embodiment has left the lawn uncut. As shown in FIG. 1, the first area 510 is, for example, an area under or around the tree, an area around a bench, an area where there was a person during work, an area where the host device could not enter, or the like. After the work of the autonomous work machine 2, a worker uses, for example, a lawn mower called a mowing machine to perform lawn mowing at a location where the autonomous work machine 2 could not enter.

The second area 520 is an area in which, when the autonomous work machine 2 of the present embodiment mows the lawn, the mowed grass is scattered outside of the work area 500, for example, on a sidewalk or the like. After the work of the autonomous work machine 2, a worker uses, for example, a device called a blower that blows the mowed grass to blow the scattered grass into, for example, the work area 500.

A third area 530 is an area left uncut by the autonomous work machine 2 of the present embodiment. After the work of the autonomous work machine 2, a worker uses, for example, a special lawn mower called an edger to manually cut the edge lawn along with the soil in a vertically direction.

[First Embodiment]

In a first embodiment, for example, an example in which a worker possesses a terminal such as a smartphone and receives additional work information from a server will be described.

<Configuration of Autonomous Work System 1>

A configuration example of an autonomous work system 1 will be described.

Figure 2:
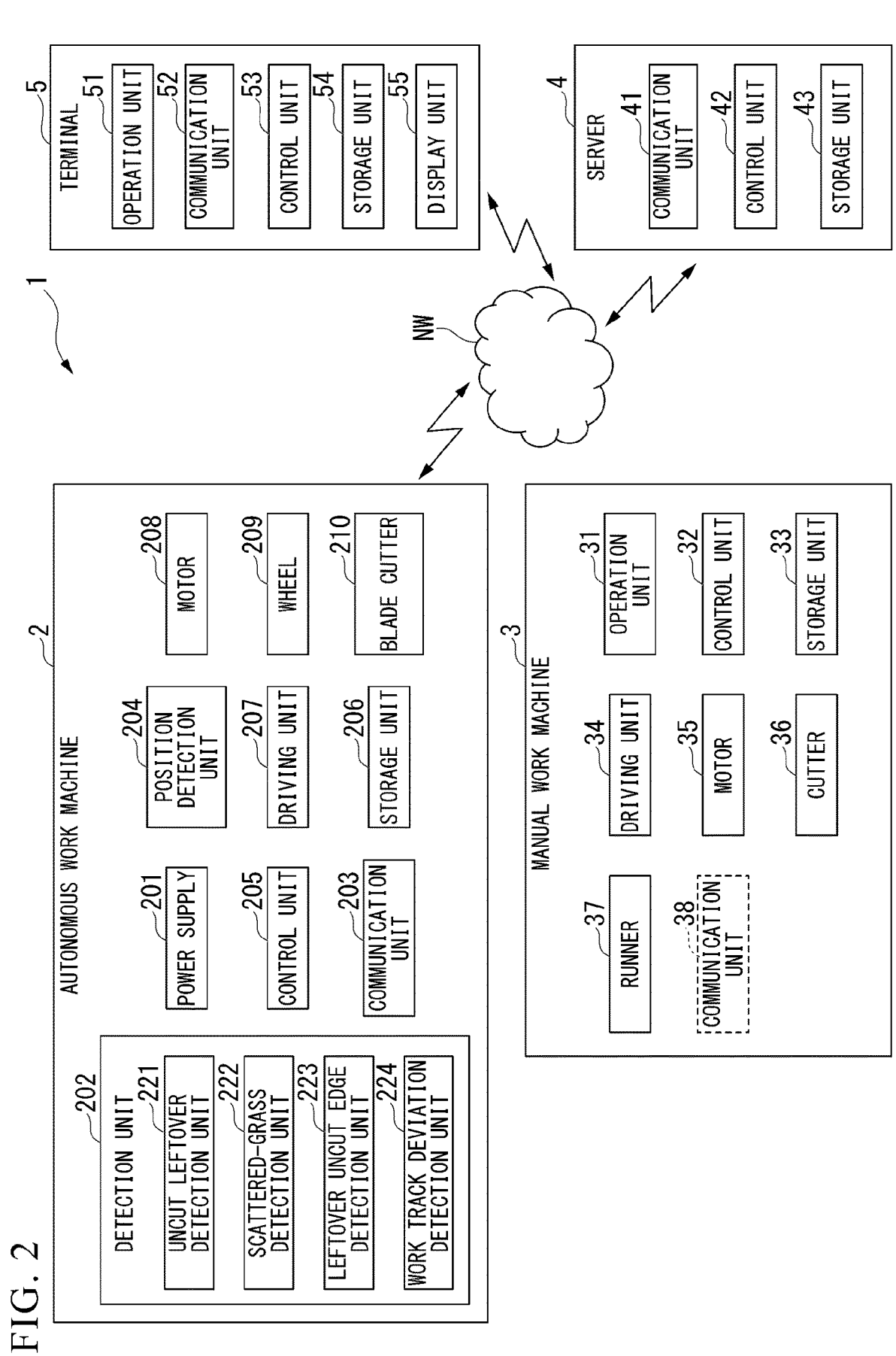
FIG. 2 is a block diagram illustrating a configuration example of an autonomous work system according to a first embodiment.

FIG. 2 is a block diagram illustrating a configuration example of the autonomous work system 1 according to the present embodiment. As shown in FIG. 2, the autonomous work system 1 includes the autonomous work machine 2 (a first work machine), a manual work machine 3 (a second work machine), a server 4 (a setting device), and a terminal 5. A plurality of manual work machines 3 having different functions may be used.

The autonomous work machine 2, the server 4, and the terminal 5 are connected to each other by wireless communication through a network NW. The network NW is, for example, the Internet, a wireless local area network (LAN), or the like.

The autonomous work machine 2 includes a power supply 201, a detection unit 202, a communication unit 203, a position detection unit 204, a control unit 205, a storage unit 206, a driving unit 207, a motor 208, a wheel 209, and a blade cutter 210. The detection unit 202 includes an uncut leftover detection unit 221, a scattered-grass detection unit 222, a leftover uncut edge detection unit 223, and a work track deviation detection unit 224.

The manual work machine 3 includes an operation unit 31, a control unit 32, a storage unit 33, a driving unit 34, a motor 35, and a cutter 36 (or a runner 37). The manual work machine 3 includes a power supply which is not shown. The manual work machine 3 may include a communication unit 38.

The server 4 includes a communication unit 41, a control unit 42, and a storage unit 43.

The terminal 5 includes an operation unit 51, a communication unit 52, a control unit 53, a storage unit 54, and a display unit 55.

<Function of the Autonomous Work Machine 2>

Next, the autonomous work machine 2 will be described.

The autonomous work machine 2 is an unmanned traveling-type lawn mower (a so-called robot-type lawn mower) capable of traveling autonomously to mow a lawn. Work which is performed by the autonomous work machine 2 is predetermined work other than, for example, work such as mowing the lawn at the edge and blowing the grass scattered on a sidewalk or the like into the work area.

The power supply 201 is, for example, a rechargeable secondary battery. The power supply 201 can be replaced by, for example, a pack type. The power supply 201 supplies electric power to each functional unit.

The detection unit 202 detects the state of work (completed work or uncompleted work (work left undone)) of the host device on the basis of work schedule information stored by the storage unit 206 and the content of work which is being currently performed. The detection unit 202 may detect the content of done work (completed work), may detect the content of undone work (work left undone), or may detect at least one of completed work and work left undone.

The uncut leftover detection unit 221 detects the first area 510 (FIG. 1) left uncut by the host device such as, for example, the vicinity of the tree within the work area.

The scattered-grass detection unit 222 detects the second area 520 (FIG. 1) in which the grass mowed by host device is scattered outside of the work area.

The leftover uncut edge detection unit 223 detects the third area 530 (FIG. 1) left uncut at the edge of the work area.

The work track deviation detection unit 224 compares, for example, work position information detected by the position detection unit 204 with position information for each work process of the work area 500 stored by the storage unit 206, and detects an area that deviates from a work track during work.

The communication unit 203 transmits detection result information to the server 4 through the network NW in accordance with control of the control unit 205. The detection result information includes a detection result detected by the detection unit 202, identification information for identifying the host device, information indicating the completion of work, and the like.

The position detection unit 204 is, for example, a Global Positioning System (GPS) receiver, and detects the position of the host device on the basis of information received from satellites. Alternatively, the position detection unit 204 detects the position of the host device, for example, by communicating with a base station installed in the vicinity of the work area. The position detection unit 204 may acquire time information on the basis of information received from satellites or the base station. The position detection unit 204 may detect information indicating the wheel speed of the wheel 209, and integrate the detected speed to detect a moved distance.

The control unit 205 acquires the work schedule information stored by the storage unit 206, generates a work instruction on the basis of the acquired work schedule information, and outputs the generated work instruction to the driving unit 207. The work schedule information includes, for example, map information of the work area (inclusive of position information within the work area), route information for performing work, and information relating to work content for which the work is scheduled to be performed. The control unit 205 causes the storage unit 206 to store the detection result detected by the detection unit 202. The control unit 205 outputs the detection result information including the detection result stored by the storage unit 206 to the communication unit 203. The control unit 205 may receive the map information from the server 4 through the network NW and the communication unit 203, and cause the storage unit 206 to store the received map information.

The storage unit 206 stores the work schedule information. The storage unit 206 may store the work schedule information in advance, or may receive the work schedule information from the server 4 and store it. The storage unit 206 stores the detection result detected by the detection unit 202. The storage unit 206 stores the identification information of the host device.

The driving unit 207 drives the motor 208 in accordance with the work instruction which is output by the control unit 205.

The motor 208 includes a wheel driving motor 208a (see FIG. 2) and a blade cutter driving motor 208b (see FIG. 2). The wheel driving motor 208a drives the wheel 209. The blade cutter driving motor 208b drives the blade cutter 210.

The wheel 209 includes a front wheel 209a (see FIG. 2) and a rear wheel 209b (see FIG. 2).

The blade cutter 210 is a cutter that mows the lawn.

The configuration example of the autonomous work machine 2 described above is an example, and the present invention is not limited thereto. For example, the autonomous work machine 2 may include an operation unit, a display unit, and the like.

<Function of the Manual Work Machine 3>

Next, the manual work machine 3 will be described.

The manual work machine 3 is one of, for example, a mower, an edger, and a blower. In a case where the manual work machine 3 is a mower or an edger, the manual work machine 3 includes the cutter 36 without including the runner 37. In a case where the manual work machine 3 is a blower, the manual work machine 3 includes the runner 37 without including the cutter 36. The manual work machine 3 may include a display unit, a communication unit, and the like.

The operation unit 31 is, for example, a switch that switches between an on state and an off state of a power supply, a switch that sets or changes the number of rotations of the motor 35, or the like.

The control unit 32 uses a control program stored by the storage unit 33 to generate a control instruction for controlling the rotation of the motor 35. The control unit 32 outputs the generated control instruction to the driving unit 34.

The storage unit 33 stores a control program used for control by the control unit 32, various setting values, and the like.

The driving unit 34 drives the motor 35.

In a case where the manual work machine 3 is a mower or an edger, the cutter 36 is attached to the motor 35. In a case where the manual work machine 3 is a mower or an edger, the motor 35 drives the cutter 36.

In a case where the manual work machine 3 is a blower, the runner 37 is attached to the motor 35. In a case where the manual work machine 3 is a blower, the motor 35 drives the runner 37.

The cutter 36 is a cutter that mows the lawn.

The runner 37 is an impeller, and blows the mowed grass by generating the wind through rotation.

<Function of Server 4>

Next, the server 4 will be described.

The communication unit 41 receives the detection result information which is transmitted by the autonomous work machine 2 through the network NW. The communication unit 41 may transmit the work schedule information which is output by the control unit 42 to the autonomous work machine 2 through the network NW.

The control unit 42 acquires the detection result information received by the communication unit 41, and causes the storage unit 43 to store the acquired detection result information. The control unit 42 uses work area information relating to the work area stored by the storage unit 43, work schedule content, and the detection result information to discriminate whether additional work in the work area is required. The control unit 42 generates additional work information relating to the additional work in a case where it is required, and outputs the generated additional work information to the communication unit 41. The additional work information includes, for example, identification information for identifying the terminal 5 which is a transmission partner, information indicating a location where the additional work is performed, information indicating the content of the additional work, and the like. The control unit 42 may generate the work schedule information using the performance of the autonomous work machine 2 (information such as a mowing width or the size of the device) stored by the storage unit 43 and the work area information.

The storage unit 43 stores work content scheduled to be performed by the autonomous work machine 2. The storage unit 43 stores the detection result information. The storage unit 43 stores the work area information (such as a shape, a position, or an obstacle). The storage unit 43 may store the performance of the autonomous work machine 2 (information such as a mowing width or the size of the device) and the performance of the manual work machine 3 (information such as a mowing width or the size of the device).

<Function of Terminal 5>

Next, the terminal 5 will be described.

The terminal 5 is any one of, for example, a smartphone, a tablet terminal, a head mounted display, and the like. The number of terminals 5 may be plural.

The operation unit 51 is, for example, a touch panel sensor, a mechanical switch, or the like provided on the display unit 55. The operation unit 51 detects an operation result operated by a worker, and outputs the detected operation result to the control unit 53.

The communication unit 52 receives the additional work information which is transmitted by the server 4 through the network NW. The additional work completion information indicating that the additional work which is output by the control unit 53 has been completed is transmitted to the server 4 through the network NW.

The control unit 53 acquires the additional work information received by the communication unit 52, and causes the storage unit 54 to store the acquired additional work information. The control unit 53 uses the additional work information to generate an image related to the additional work information. The image related to the additional work information will be described later. The control unit 53 detects that the additional work has been completed on the basis of the result of operation operated by the operation unit 51. In a case where it is detected that the additional work has been completed, the control unit 53 outputs the additional work completion information to the communication unit 52.

The storage unit 54 stores the identification information of the host device. The storage unit 54 stores the additional work information.

The display unit 55 is, for example, a liquid crystal display, an organic electro luminescence (EL) display device, or the like. The display unit 55 displays the image related to the additional work information generated by the control unit 53.

<Outward Appearance Example of Autonomous Work Machine 2>

Figure 3:
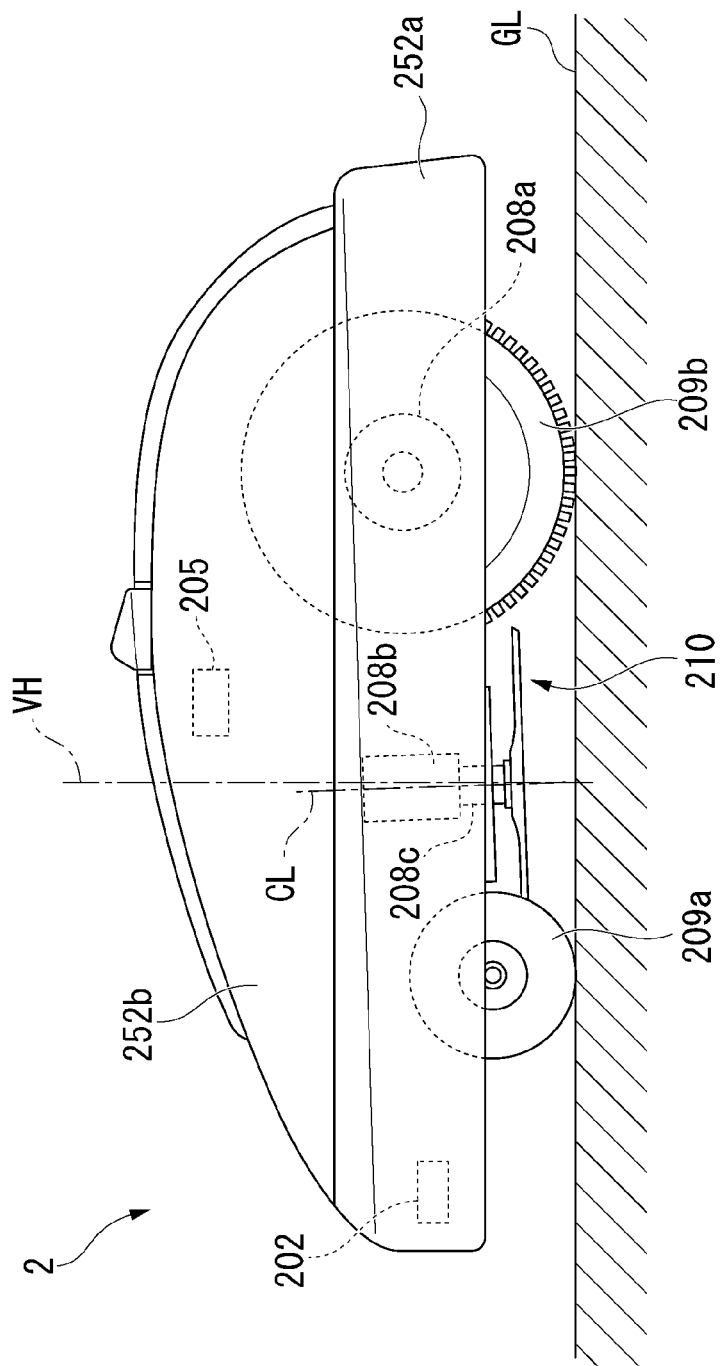
FIG. 3 is a side view of an autonomous work machine according to the first embodiment.

Next, an outward appearance example of the autonomous work machine 2 will be described. FIG. 3 is a side view of the autonomous work machine 2 according to the present embodiment.

As shown in FIG. 3, the autonomous work machine 2 includes a frame 252b, a chassis 252a, the right and left front wheels 209a included in the front part of the chassis 252a, and the right and left rear wheels 209b included in the rear part of the chassis 252a, the control unit 205, the wheel driving motor 208a, the blade cutter driving motor 208b, and the blade cutter 210.

The wheel driving motor 208a is attached to, for example, each of the right and left rear wheels 209b. By the wheel driving motors 208a rotating forward at a constant speed or rotating backward at a constant speed, the autonomous work machine 2 travels straight in a front-rear direction. The autonomous work machine 2 turns by only any one of the right and left wheel driving motors 208a rotating backward.

The blade cutter 210 is attached to the blade cutter driving motor 208b so as to be rotatable about a rotating shaft 208c extending vertically with respect to the chassis 252a. The blade cutter 210 includes, for example, three blades. The blade cutter 210 is, for example, a press-molded product of a metal sheet material formed in a disk shape with the center CL of the rotating shaft 208c as the center of rotation.

The rotating shaft 208c extends vertically with respect to the chassis 252a. The rotating shaft 208c is approximately perpendicular to horizontal grassplot GL, that is, a ground GL. Preferably, the rotating shaft 208c is slightly inclined from top to rear downward with respect to a vertical line VH. This reason is to prevent the blade cutter 210 from rubbing against the surface of the lawn after being cut by the blade cutter 210 while the autonomous work machine 2 is traveling forward.

The blade cutter 210 is configured to be able to change the height of the chassis 252a in a vertical direction by control of the control unit 205.

<Example of Image Related to Additional Work Information Displayed on Terminal 5>

Next, an example of an image related to additional work information displayed on the terminal 5 will be described.

Figure 4:
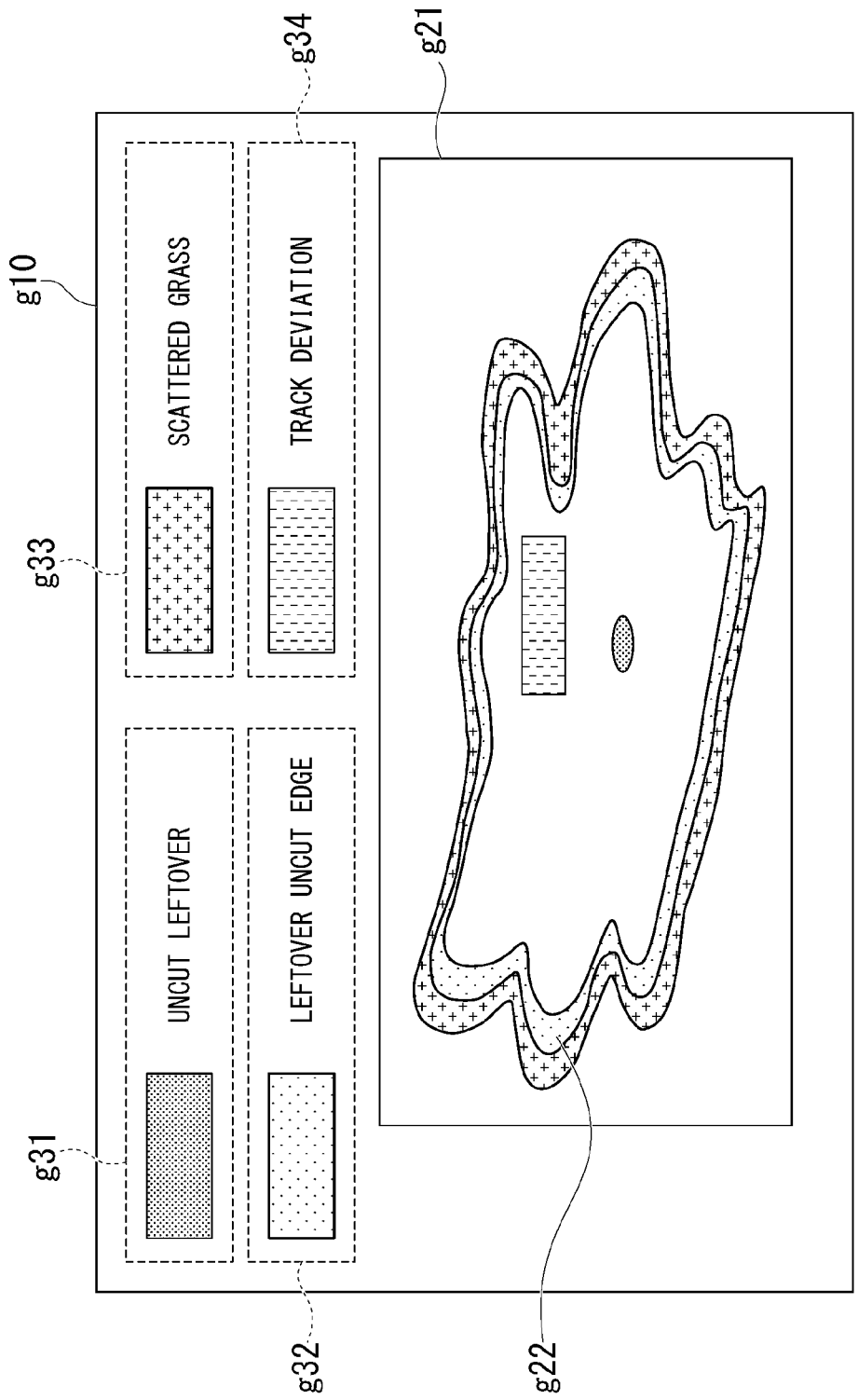
FIG. 4 is a diagram illustrating an example of an image related to additional work information which is displayed on a terminal according to the first embodiment.

FIG. 4 is a diagram illustrating an example of an image related to additional work information which is displayed on the terminal 5 according to the present embodiment.

In the example of FIG. 4, an image g10 related to additional work information includes an image g21 and images g31 to g34.

The image g21 includes an image indicating a work area, an image indicating an area in which additional work needs to be performed, and an image indicating the type of work required for the area.

The image g31 is a type image indicating an uncut leftover among the types of the contents of the additional work.

The image g32 a type image indicating a leftover uncut edge among the types of the contents of the additional work.

The image g33 is a type image indicating scattered grass among the types of the contents of the additional work.

The image g34 a type image indicating that there is an uncut leftover caused by track deviation among the types of the contents of the additional work.

The image shown in FIG. 4 is an example, and the present invention is not limited thereto. For example, in FIG. 4, each of the images g31 to g34 may be a button image. When uncut leftover work is completed, a worker may touch, for example, the button image of the image g31. In a case where the button image of the image g31 is touched, the operation unit 51 may detect that the uncut leftover is selected. In a case where the uncut leftover is selected, the control unit 53 may regard as work of the first area left uncut having been completed, and transmit information indicating that the work of the first area has been completed to the server 4 through the network NW.

In the image g21 of FIG. 4, the control unit 53 may not display each additional work area in an initial state. In this case, for example, when the button image of the image g32 is selected by a worker, an image g22 indicating the leftover uncut edge may be displayed in the image g21.

<Processing Procedure Example of the Autonomous Work System 1>

Next, a processing procedure example of the autonomous work system 1 will be described.

Figure 5:
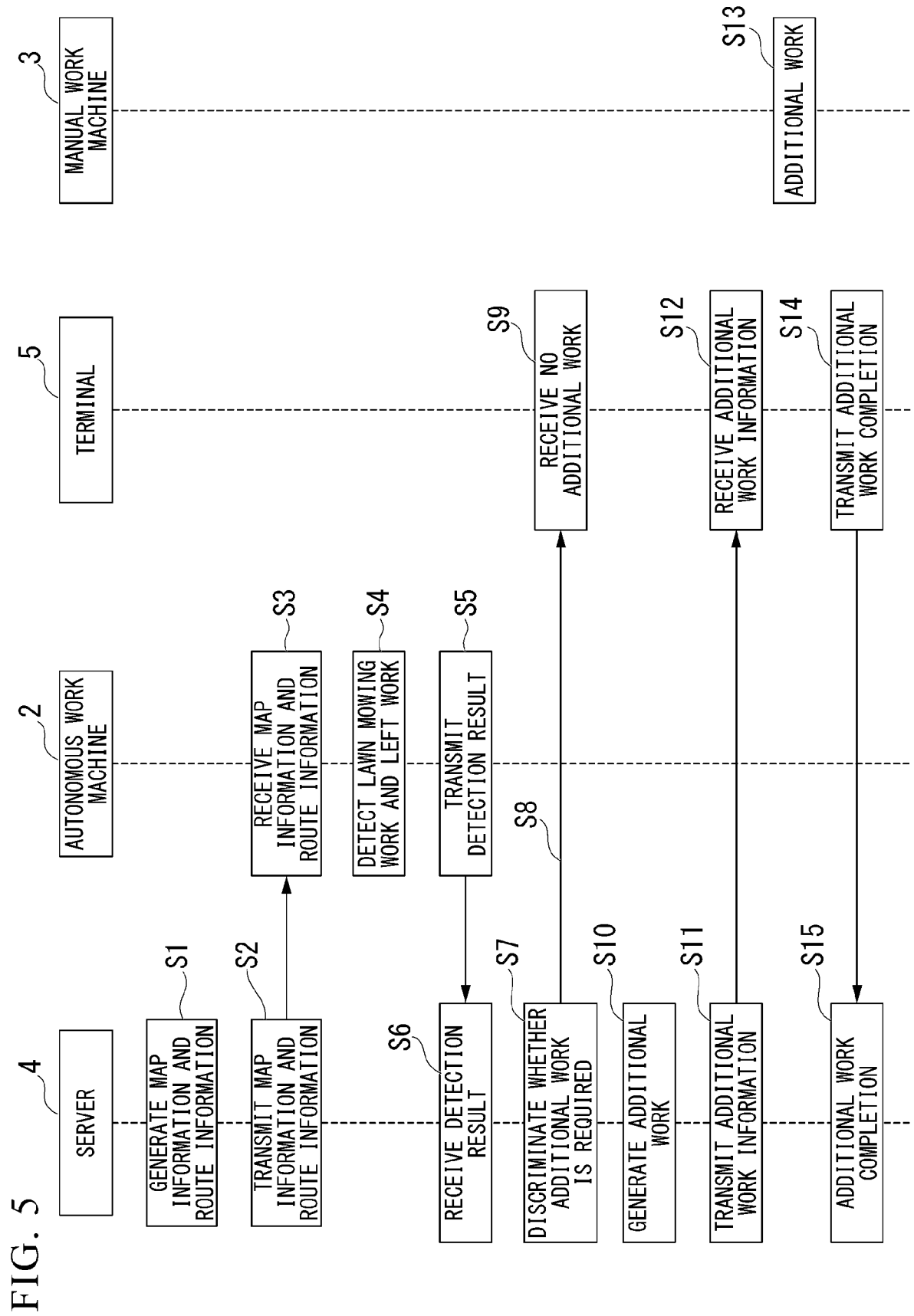
FIG. 5 is a sequence diagram of a processing procedure example of the autonomous work system according to the first embodiment.

FIG. 5 is a sequence diagram of a processing procedure example of the autonomous work system 1 according to the present embodiment. The following example describes an example in which the server 4 creates map information and route information of a work area and transmits the created map information and route information to the autonomous work machine 2.

(Step S1) The control unit 42 of the server 4 creates work schedule information including the map information and route information of the work area and information indicating work content.

(Step S2) The control unit 42 of the server 4 transmits the created work schedule information to the autonomous work machine 2 through the communication unit 41 and the network NW. The work schedule information includes a work start instruction.

(Step S3) The control unit 205 of the autonomous work machine 2 receives the work schedule information transmitted by the server 4 through the network NW and the communication unit 203.

(Step S4) The control unit 205 of the autonomous work machine 2 starts lawn mowing work using the received work schedule information. The control unit 205 acquires a detection result detected by the detection unit 202 during the work, for example, at predetermined time intervals, and causes the storage unit 206 to store the acquired detection result.

(Step S5) The control unit 205 of the autonomous work machine 2 transmits detection result information to the server 4 through the communication unit 203 and the network NW after the completion of the work. The detection result information includes identification information of the autonomous work machine 2, information indicating the completion of the work, and the like.

(Step S6) The control unit 42 of the server 4 receives the detection result information transmitted by the autonomous work machine 2 through the network NW and the communication unit 203.

(Step S7) The control unit 42 of the server 4 discriminates whether the additional work is required on the basis of the received detection result information, the content of work scheduled to be performed by the autonomous work machine 2 stored in the host device, and the map information of the work area.

(Step S8) In a case where it is discriminated that the additional work is not required, the control unit 42 of the server 4 transmits information indicating that there is no additional work to the terminal 5 through the communication unit 41 and the network NW. The transmission information includes identification information of the terminal 5 which is a transmission destination. In a case where the number of terminals 5 is plural, the server 4 may transmit that the additional work is not required to a plurality of terminals 5. In a case where the number of terminals 5 is plural, a first terminal 5 may be possessed by a worker, and a second terminal 5 may be possessed by a manager.

(Step S9) The control unit 53 of the terminal 5 receives the information indicating that there is no additional work transmitted by the server 4 through the communication unit 52 and the network NW. Subsequently, the control unit 53 displays the received information indicating that there is no additional work on the display unit 55.

(Step S10) In a case where it is discriminated that the additional work is required, the control unit 42 of the server 4 generates additional work information including additional work content, an additional work location, and the like. The additional work information includes the identification information of the terminal 5 which is a transmission destination and the manual work machine 3 to be used. The control unit 42 selects an optimum manual work machine 3 for each additional work on the basis of information of performance for each manual work machine 3 stored by the storage unit 43 and the detection result information.

(Step S11) The control unit 42 of the server 4 transmits the additional work information to the terminal 5 through the communication unit 41 and the network NW. In a case where the number of terminals 5 is plural, the server 4 may transmit the additional work information to a plurality of terminals 5.

(Step S12) The control unit 53 of the terminal 5 receives the additional work information transmitted by the server 4 through the communication unit 52 and the network NW. Subsequently, the control unit 53 generates an image related to the additional work information as shown in FIG. 4 on the basis of the received additional work information. Subsequently, the control unit 53 displays the generated image related to the additional work information on the display unit 55.

(Step S13) A worker selects the manual work machine 3 on the basis of the information displayed on the terminal 5, and performs the additional work using the selected manual work machine 3.

(Step S14) When the additional work is completed, a worker operates the operation unit 51 of the terminal 5, and registers the completion of the additional work. The control unit 53 of the terminal 5 generates additional work completion information on the basis of the operation result detected by the operation unit 51, and transmits the generated additional work completion information to the server 4 through the communication unit 52 and the network NW. The timing of transmission may be each time when one type of additional work (for example, an uncut leftover) is completed in a case where the number of pieces of the additional work is plural, or may be when all the additional work is completed.

(Step S15) The control unit 42 of the server 4 receives the additional work completion information transmitted by the terminal 5 through the network NW and the communication unit 203.

In the example described with reference to FIG. 5, although an example in which the autonomous work system 1 includes the server 4 and the terminal 5 has been described, for example, the terminal 5 may have the function of the server 4.

<Example of Work Procedure>

Here, an example of work in a work area performed by the autonomous work machine 2 will be described with reference to FIG. 6.

Figure 6:
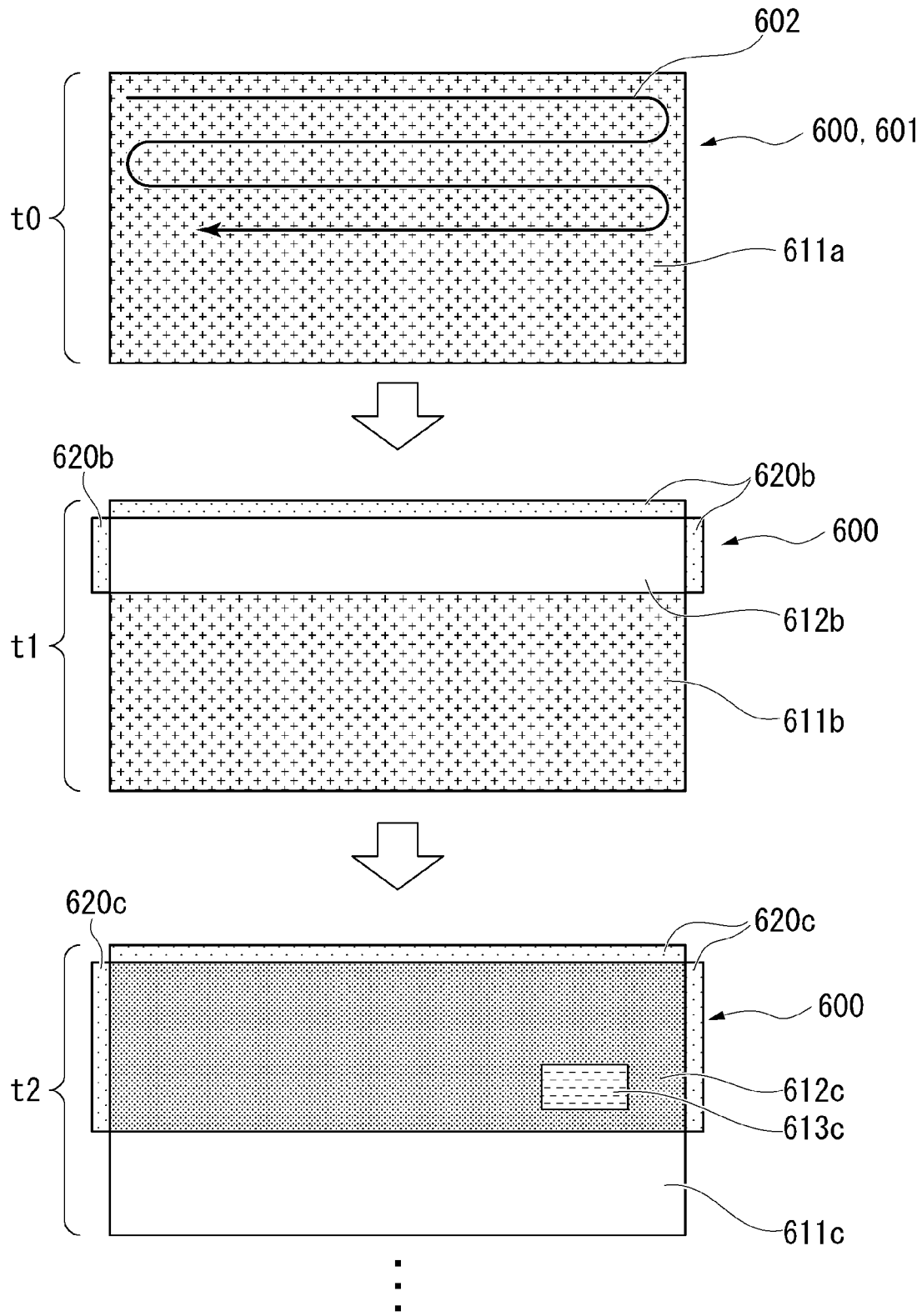
FIG. 6 is a diagram illustrating a work example of the area of work which is performed by the autonomous work machine according to the first embodiment.

FIG. 6 is a diagram illustrating an example of work in a work area performed by the autonomous work machine 2 according to the present embodiment. In the example of FIG. 6, for the purpose of simplifying the description, the shape of the work area is set to be rectangular, but the shape of the work area is not limited thereto.

Because before the work starts at time t0, a work area 600 is an area 611a in which lawn mowing in all the grassplot is not performed. Map information 601 includes the shape of the work area 600, for example, position information (latitude, longitude, and altitude) of four corners of the work area 600, and the like. In FIG. 6, route information 602 is a route that proceeds in the longitudinal direction of the work area 600 and turns 360 degrees after arrival at the end to continue the work.

Because the work is started at time t1, the work area 600 includes an area 611b in which lawn mowing has been completed, an area 612b in which lawn mowing has not been completed, and a leftover uncut edge area 621b.

At time t2 after time t1, the work area 600 includes an area 611c in which lawn mowing has been completed, the area 612b in which lawn mowing has not been completed, an uncut leftover area (or location) 613c, and the leftover uncut edge area 621b.

The autonomous work machine 2 advances the work as shown in FIG. 6, completes the work on the basis of the work schedule information including the map information 601 and the route information 602 which are received from the server 4, and then transmits a detection result including information of the detected uncut leftover area (or location) and leftover uncut edge area to the server 4.

The autonomous work machine 2 may transmit the detection result to the server 4 at predetermined time intervals during the work. In this case, additional work information in or near the area in which the work has been completed may be generated and transmitted to the terminal 5.

The server 4 transmits the additional work information to the terminal 5 on the basis of the detection result information received from the autonomous work machine 2. In a case where the number of pieces of the additional work is plural, the additional transmission information to be transmitted may include information indicating the order of work.

The autonomous work machine 2 may, for example, detect the peripheral situation of a target work area using a camera or the like at the start of the work or during the work. In a case where it is determined that the autonomous work machine 2 cannot enter or cannot perform work (that is, it will be left undone as a result), or a case it is determined that an image of the peripheral lawn situation or the like is captured by a camera or the like for confirmation after the work and it is different from work schedule content (such as, for example, a length which is not cut as instructed), the autonomous work machine 2 may upload the result to the server 4 as an "undone leftover." Alternatively, the autonomous work machine 2 may upload only the work completion result to the server 4, and the server 4 may use the result to determine which portion is left undone. Alternatively, the autonomous work machine 2 may determine which portion is left undone by its own device on the basis of the acquired information. In this manner, in the present embodiment, work which is left undone may be determined by the autonomous work machine 2, or may be determined by the server 4 side.

Here, a procedure example of determination of work which is left undone will be further described.

First, an example in which the server 4 side makes a determination will be described.

Procedure 1: The autonomous work machine 2 captures an image of the work completion state of its own device, or detects it using a device other than a camera. Alternatively, an external detection device other than its own device (for example, a monitoring camera in the vicinity, a detection device attached to a drone, or the like may be used) capture an image of the work completion state (or detect it using a device other than a camera).

Procedure 2: The autonomous work machine 2 or the external detection device transmits data of the work completion state to the server 4. The server 4 determines where an undone leftover is in the target work area on the basis of the received information.

Procedure 3: The server 4 determines to which autonomous work machine 2 the undone leftover work is allocated on the basis of undone leftover data, and instructs the corresponding autonomous work machine 2 on the work content (inclusive of the work area).

By processing on the server 4 side in this manner, the load of the server 4 increases. However, as the number of autonomous work machines 2 increases, the cost of the whole system becomes more inexpensive and information is also collected, so that it is possible to obtain the effect of enabling more appropriate allocation.

Next, an example in which the autonomous work machine 2 makes a determination will be described.

Procedure 1: The autonomous work machine 2 captures an image of the work completion state of its own device (or detects it using a device other than a camera). Alternatively, an external detection device other than its own device captures an image of the work completion state (or detects it using a device other than a camera).

Procedure 2: The autonomous work machine 2 uses the information in Procedure 1 to determine the undone leftover and send the undone leftover data to the server 4.

Procedure 3: The server 4 determines to which work machine the undone leftover work is allocated on the basis of the undone leftover data, and instructs the corresponding autonomous work machine 2.

In this manner, in a case where the autonomous work machine 2 determines the undone leftover, the autonomous work machine 2 may also determine the allocation, and transmit the allocation content to the server 4. In this case, the server 4 may instruct the corresponding autonomous work machine 2. Alternatively, the allocated autonomous work machine 2 may directly transmit the allocation content to the autonomous work machine 2.

In this manner, it is possible to reduce the load of the server 4 by the autonomous work machine 2 making a determination. In a case where the number of autonomous work machines 2 is small, the autonomous work machine 2 making a determination rather than the server 4 making a determination makes it possible to obtain the effect of enabling the system to be inexpensive.

Next, an example of work performed by a worker after the work of the autonomous work machine 2 is performed will be described with reference to FIGS. 7 to 9.

Figure 7:
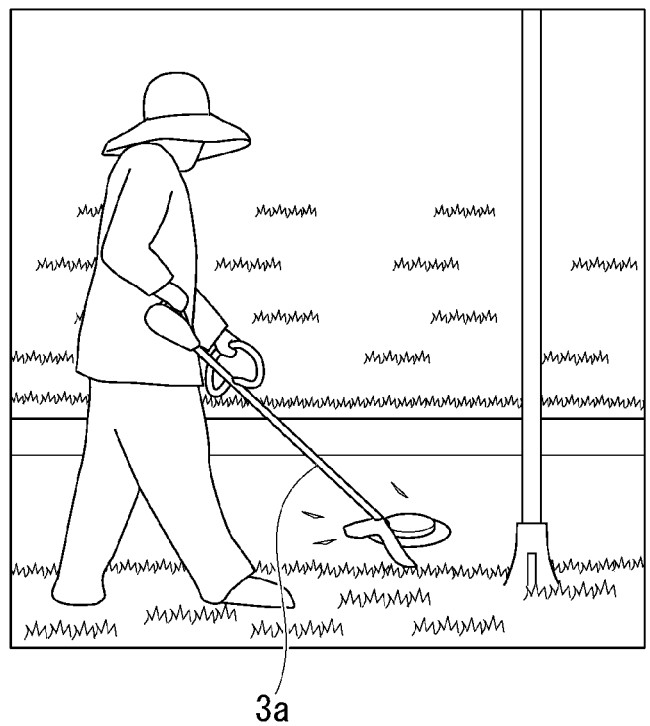
FIG. 7 is an image diagram in which a first worker is performing work using a lawn mower.

FIG. 7 is an image diagram in which a worker is performing work using a lawn mower (the manual work machine 3a). In the example of FIG. 7, the worker uses a lawn mower (the manual work machine 3a) to perform lawn mowing work in an area left uncut because the autonomous work machine 2 cannot enter.

Figure 8:
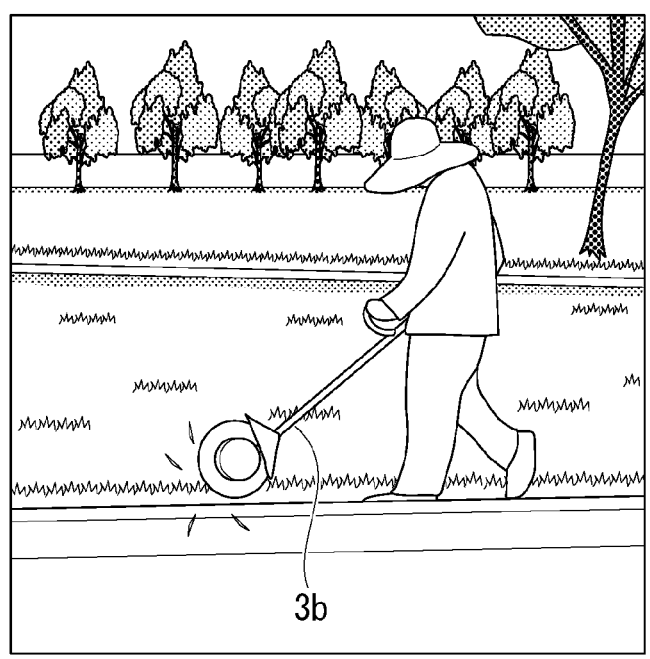
FIG. 8 is an image diagram in which the first worker is performing work using an edger.

FIG. 8 is an image diagram in which the worker is performing work an edger (the manual work machine 3b). In the example of FIG. 8, the worker uses an edger (the manual work machine 3b) to perform work for cutting the lawn and, for example, the lawn at the edge of a sidewalk along with the soil in a vertically direction.

Figure 9:
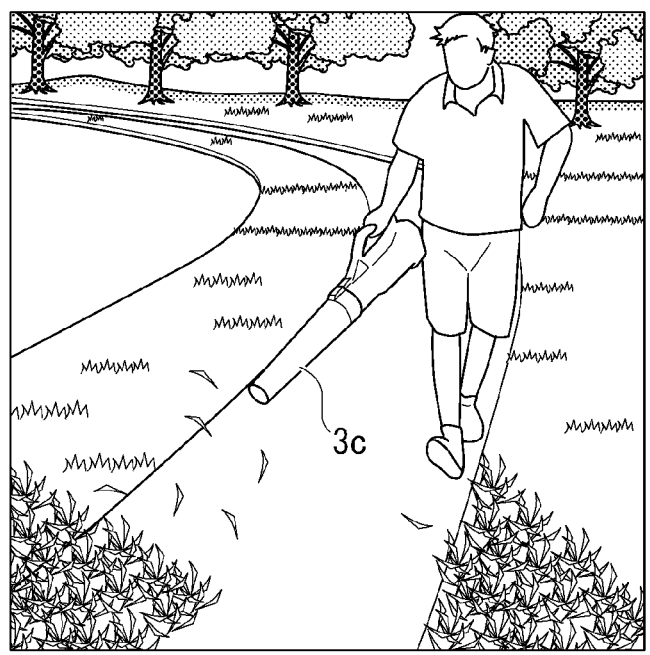
FIG. 9 is an image diagram in which the first worker is performing work using a blower.

FIG. 9 is an image diagram in which the worker is performing work using a blower (the manual work machine 3c). In the example of FIG. 9, the worker uses a blower (the manual work machine 3c) to perform work for blowing, for example, the mowed grass protruding from a sidewalk into the grassplot in a work area.

The worker confirms an image related to additional work information displayed on the terminal 5, and performs work using, for example, a lawn mower. Subsequently, the worker performs work, for example, using an edger. The worker registers that work of the first area left uncut has been completed in the terminal 5. Subsequently, the terminal 5 transmits first additional work completion information indicating that the work of the first area left uncut has been completed to the server 4.

Hereinafter, the worker confirms the image related to the additional work information displayed on the terminal 5, performs work using, for example, a blower, and registers that work of the third area in which the grass is scattered has been completed in the terminal 5. Subsequently, the terminal 5 transmits second additional work completion information indicating that the work of the third area in which the grass is scattered has been completed to the server 4.

As described above, in the present embodiment, the autonomous work machine 2 first performs work, and the autonomous work machine 2 detects the remaining work among the contents of work scheduled within the work area. In the present embodiment, the server 4 is made to acquire the detection result information received from the autonomous work machine 2. In a case where there is no work left undone, the detection result information includes information indicating that there is no work left undone. The server 4 discriminates whether additional work is required, and transmits additional work information indicating the content of the additional work to the terminal 5 in a case where the additional work is required. The terminal 5 displays and presents the received additional work information to present the additional work and the content of the additional work (inclusive of the manual work machine 3 to be used) to the worker.

Thereby, according to the present embodiment, it is possible to reduce the risk of leaving work left behind by the autonomous work machine 2 as it is.

According to the present embodiment, the worker can know in which area (location) the work left undone by the autonomous work machine 2 is, and can further know an optimum manual work machine 3 for the work. As a result, according to the present embodiment, it is possible to perform work efficiently.

In the present embodiment, in a case where a manager possesses the terminal 5, there is a tendency for the state of progress of lawn mowing work to be ascertained.

According to the present embodiment, it is possible to perform work efficiently, and to ascertain the state of progress of the work. Therefore, even in a case where work scheduled in the work area is not advanced as scheduled by the autonomous work machine 2, the worker can cope with the work through additional work performed by the manual work machine 3.

In the above-described example, although an example in which the manual work machine 3 is operated by the worker has been described, the present invention is not limited thereto. The manual work machine 3 may also be a work machine having limited functions which is capable of self-propelling and autonomously working.

<Modification Example>

In the above-described work example, although an example in which the work of the area left uncut is performed by the worker using a lawn mower or the like has been described, the present invention is not limited thereto. In a case where there is an autonomous work machine 2 (2a, 2b) that performs predetermined different work, for example, the first autonomous work machine 2a may perform main lawn mowing work, and the second autonomous work machine 2b may perform lawn mowing work in the first area left uncut.

In this case, for example, when the work is completed, the first autonomous work machine 2a may transmit first detection result information relating to an uncut leftover to the server 4.

The server 4 may generates map information and route information relating to the second autonomous work machine 2b on the basis of the first detection result information received from the first autonomous work machine 2a and the performance of the second autonomous work machine 2b stored by the storage unit 43. The server 4 may transmit the generated map information and route information relating to the second autonomous work machine 2b (inclusive of identification information of the second autonomous work machine 2*b*) to the second autonomous work machine 2*b*.

The second autonomous work machine 2*b* may perform the work on the basis of the received map information and route information. When the work is completed, the second autonomous work machine 2*b* may transmit second detection result information relating to an uncut leftover to the server 4.

The server 4 may generate additional work information on the basis of the second detection result information received from the second autonomous work machine 2*b*, and transmit the generated additional work information to the terminal 5.

[Second Embodiment]

In the first embodiment, although an example in which the autonomous work system 1 includes the manual work machine 3 and the terminal 5 has been described, the present invention is not limited thereto. In the present embodiment, an example in which the manual work machine 3 has a function of the terminal 5 will be described.

A configuration example of an autonomous work system 1A will be described.

Figure 10:
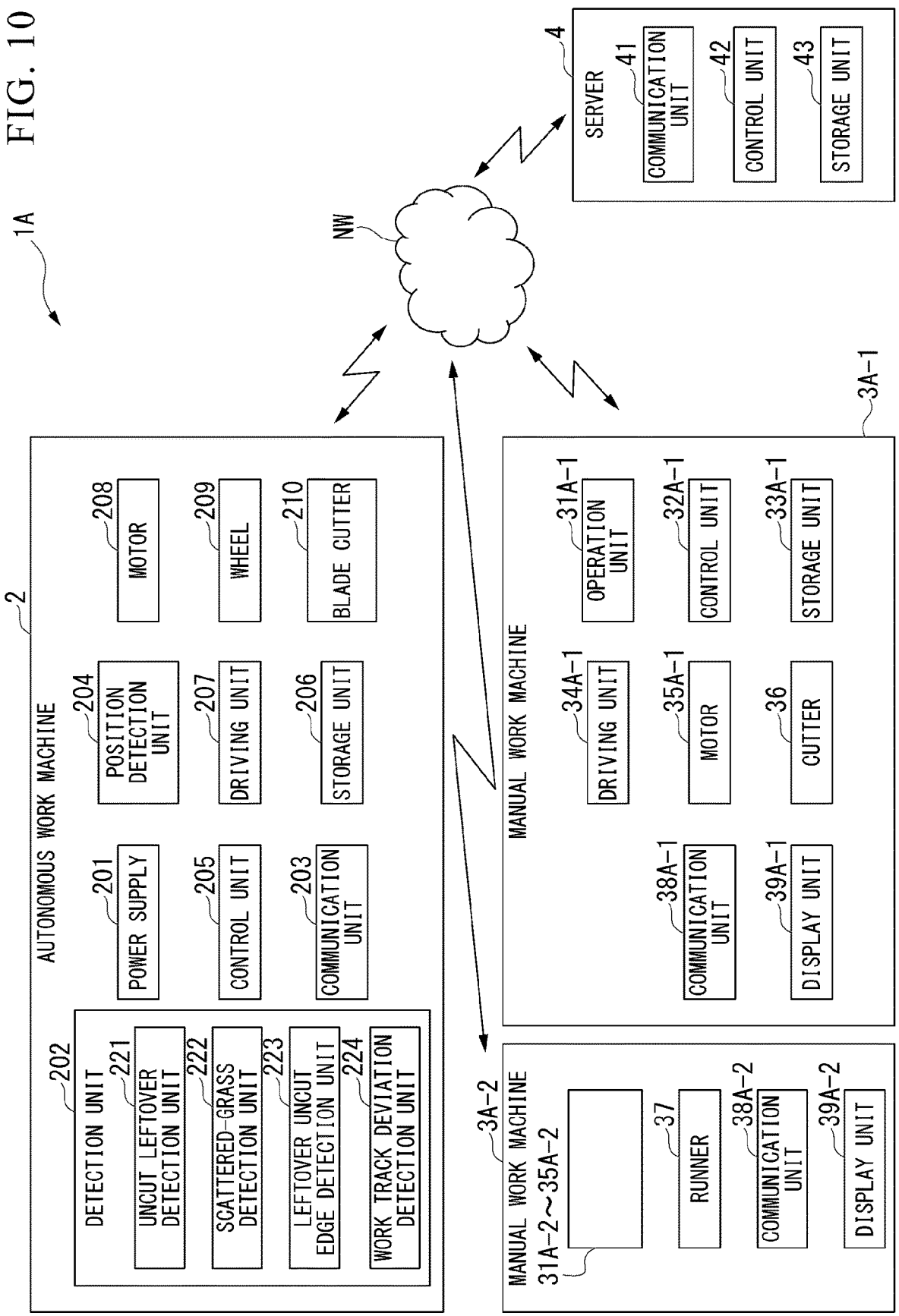
FIG. 10 is a block diagram illustrating a configuration example of an autonomous work system according to a second embodiment.

FIG. 10 is a block diagram illustrating a configuration example of the autonomous work system 1A according to the present embodiment. As shown in FIG. 2, the autonomous work system 1 includes the autonomous work machine 2 (a first work machine), a first manual work machine 3A-1 (a second work machine), a second manual work machine 3A-2 (a second work machine), and the server 4 (a setting device). Devices having the same functions as the devices of the autonomous work system 1 of the first embodiment and the same functions are denoted by the same reference numeral and signs as those in FIG. 2 and the description thereof will not be given.

The autonomous work machine 2, the server 4, the first manual work machine 3A-1, and the second manual work machine 3A-2 are connected to each other by wireless communication through the network NW.

The first manual work machine 3A-1 includes an operation unit 31A-1, a control unit 32A-1, a storage unit 33A-1, a driving unit 34A-1, a motor 35A-1, the cutter 36, a communication unit 38A-1, and a display unit 39A-1. The first manual work machine 3A-1 includes a power supply which is not shown.

The second manual work machine 3A-2 is, for example, a blower. The second manual work machine 3A-2 includes an operation unit 31A-2, a control unit 32A-2, a storage unit 33A-2, a driving unit 34A-2, a motor 35A-2, the runner 37, a communication unit 38A-2, and a display unit 39A-2. The second manual work machine 3A-2 includes a power supply which is not shown.

First, the operation of the first manual work machine 3A-1 will be described. The first manual work machine 3A-1 is, for example, a lawn mower.

The operation unit 31A-1 is, for example, a switch that switches between an on state and an off state of a power supply, a switch that sets or changes the number of rotations of the motor 35, or the like. The operation unit 31A-1 may be a touch panel sensor provided on the display unit 39A-1.

The control unit 32A-1 uses a control program stored by the storage unit 33A-1 to generate a control instruction for controlling the rotation of the motor 35A-1. The control unit 32A-1 outputs the generated control instruction to the driving unit 34A-1. The control unit 32A-1 acquires additional work information which is output by the communication unit 38A-1, and generates a presentation image indicating the acquired additional work information. The control unit 32A-1 displays the generated presentation image on the display unit 39A-1.

The storage unit 33A-1 stores a control program used for control by the control unit 32A-1, various setting values, the identification information of the host device, and the like.

The driving unit 34A-1 drives the motor 35A-1.

The cutter 36 is attached to the motor 35A-1. The motor 35A-1 drives the cutter 36.

The communication unit 38A-1 receives the additional work information which is transmitted by the server 4.

The display unit 39A-1 is, for example, a liquid crystal display or an organic EL display device. The display unit 39A-1 displays a presentation image on the basis of control of the control unit 32A-1.

Next, the operation of the second manual work machine 3A-2 will be described. The second manual work machine 3A-2 is, for example, a blower.

The operation unit 31A-2 is the same as the operation unit 31A-1. The control unit 32A-2 is the same as the control unit 32A-1. The storage unit 33A-1 is the same as the storage unit 33A-1. The driving unit 34A-1 is the same as the driving unit 34A-1. The communication unit 38A-2 is the same as the communication unit 38A-1. The display unit 39A-2 is the same as the display unit 39A-1.

The runner 37 is attached to the motor 35A-2. The motor 35A-1 drives the runner 37.

<Processing Procedure Example of Autonomous Work System 1A>

Next, a processing procedure example of the autonomous work system 1A will be described.

Figure 11:
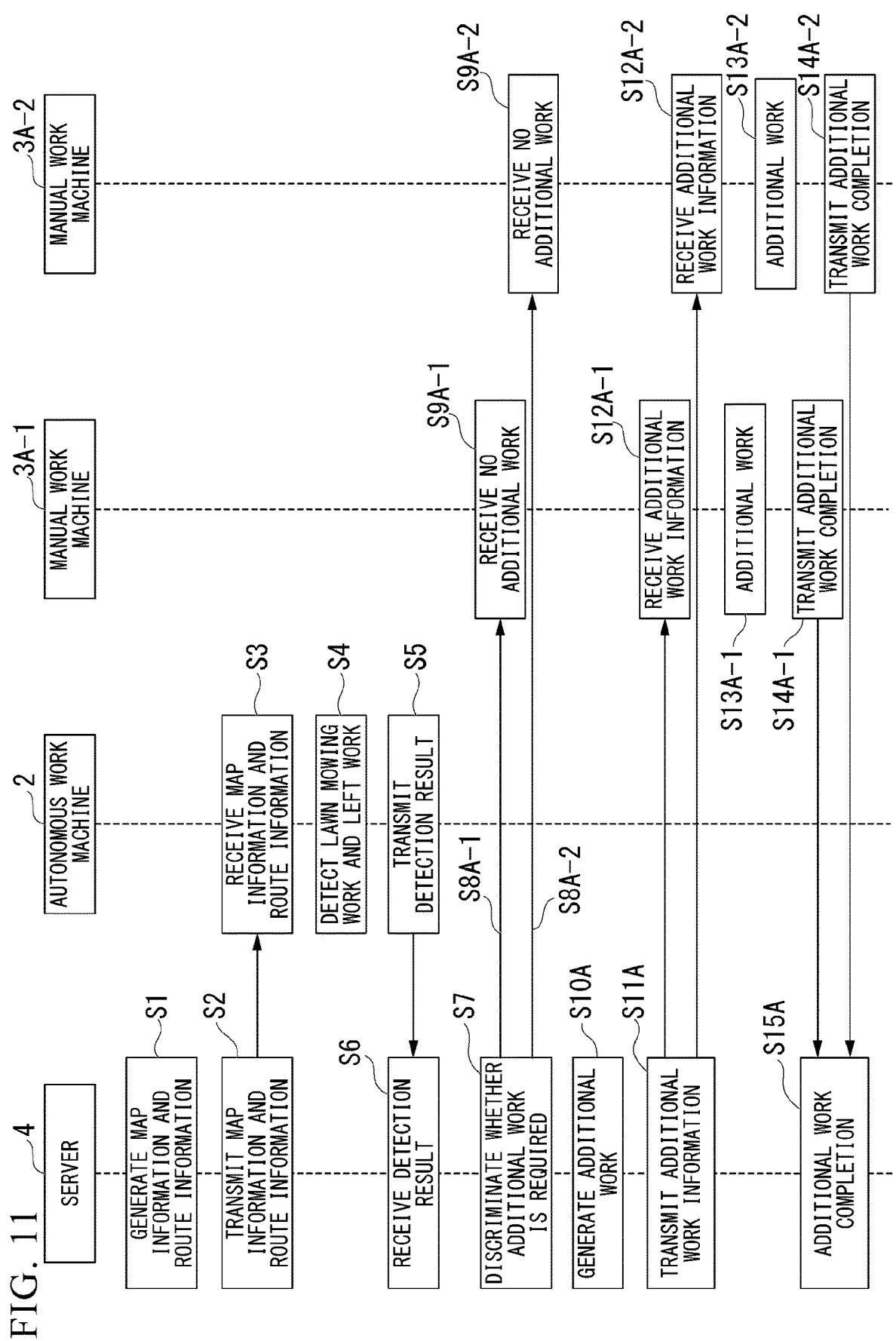
FIG. 11 is a sequence diagram of a processing procedure example of the autonomous work system according to the second embodiment.

FIG. 11 is a sequence diagram of a processing procedure example of the autonomous work system 1A according to the present embodiment. The same processes as those in the autonomous work system 1 are denoted by the same reference numeral and signs and the description thereof will not be given.

(Steps S1 and S2) The server 4 performs the processes of steps S1 and S2.

(Steps S3 to S5) The autonomous work machine 2 performs the processes of steps S3 to S5.

(Steps S6 and S7) The server 4 performs the processes of steps S6 and S7.

(Step S8A-1) In a case where it is discriminated that the additional work is not required, the control unit 42 of the server 4 transmits information indicating that there is no additional work to the first manual work machine 3A-1 through the communication unit 41 and the network NW. The transmission information includes identification information of the first manual work machine 3A-1 which is a transmission destination.

(Step S8A-2) In a case where it is discriminated that the additional work is not required, the control unit 42 of the server 4 transmits the information indicating that there is no additional work to the second manual work machine 3A-2 through the communication unit 41 and the network NW. The transmission information includes identification information of the second manual work machine 3A-2 which is a transmission destination.

(Step S9A-1) The control unit 32A-1 of the first manual work machine 3A-1 receives the information indicating that there is no additional work transmitted by the server 4 through the communication unit 38A-1 and the network NW. Subsequently, the control unit 32A-1 displays the received information indicating that there is no additional work on the display unit 39A-1.

(Step S9A-2) The control unit 32A-2 of the second manual work machine 3A-2 receives the information indicating that there is no additional work transmitted by the server 4 through the communication unit 38A-2 and the network NW. Subsequently, the control unit 32A-2 displays the received information indicating that there is no additional work on the display unit 39A-2.

(Step S10A) In a case where it is discriminated that the additional work is required, the control unit 42 of the server 4 generates additional work information including additional work content, an additional work location, and the like for each manual work machine 3. First additional work information which is transmitted to the first manual work machine 3A-1 includes information relating to additional work (for example, lawn mowing work at a location left uncut) performed by the first manual work machine 3A-1 and the identification information of the first manual work machine 3A-1. Second additional work information which is transmitted to the second manual work machine 3A-2 includes information relating to additional work (for example, work for blowing the grass scattered on a sidewalk or the like to the grassplot) performed by the second manual work machine 3A-2 and the identification information of the second manual work machine 3A-2. The control unit 42 of the server 4 allocates the manual work machine 3 appropriate for the work on the basis of the performance of the first manual work machine 3A-1 and the second manual work machine 3A-2 stored by the storage unit 43 and the content of the additional work.

(Step S11A) The control unit 42 of the server 4 transmits the additional work information to the first manual work machine 3A-1 and the second manual work machine 3A-2 through the communication unit 41 and the network NW.

(Step S12A-1) The control unit 32A-1 of the first manual work machine 3A-1 receives the first additional work information transmitted by the server 4 through the communication unit 38A-1 and the network NW. Subsequently, the control unit 32A-1 generates an image related to the additional work information on the basis of the received first additional work information. Subsequently, the control unit 32A-1 displays the generated image related to the additional work information on the display unit 39A-1.

(Step S12A-2) The control unit 32A-2 of the second manual work machine 3A-2 receives the first additional work information transmitted by the server 4 through the communication unit 38A-2 and the network NW. Subsequently, the control unit 32A-2 generates an image related to the additional work information on the basis of the received second additional work information. Subsequently, the control unit 32A-2 displays the generated image related to the additional work information on the display unit 39A-2.

(Step S13A-1) The worker performs the additional work using the first manual work machine 3A-1 on the basis of the information displayed on the first manual work machine 3A-1.

(Step S13A-2) The worker performs the additional work using the second manual work machine 3A-2 on the basis of the information displayed on the second manual work machine 3A-2.

(Step S14A-1) When the additional work is completed, the worker operates the operation unit 31A-1 of the first manual work machine 3A-1, and registers that the additional work has been completed. The control unit 32A-1 of the first manual work machine 3A-1 generates additional work completion information on the basis of the operation result detected by the operation unit 31A-1, and transmits the generated additional work completion information to the server 4 through the communication unit 38A-1 and the network NW. The additional work completion information includes the identification information of the host device.

(Step S14A-2) When the additional work is completed, the worker operates the operation unit 31A-2 of the second manual work machine 3A-2, and registers that the additional work has been completed. The control unit 32A-2 of the second manual work machine 3A-2 generates additional work completion information on the basis of the operation result detected by the operation unit 31A-2, and transmits the generated additional work completion information to the server 4 through the communication unit 38A-2 and the network NW. The additional work completion information includes the identification information of the host device.

(Step S15A) The control unit 42 of the server 4 receives the additional work completion information transmitted by the first manual work machine 3A-1 through the network NW and the communication unit 203. The control unit 42 receives the additional work completion information transmitted by the second manual work machine 3A-2 through the network NW and the communication unit 203. The control unit 42 discriminates that the information has been received from the first manual work machine 3A-1 or the second manual work machine 3A-2 on the basis of the identification information included in the additional work completion information.

As described above, in the present embodiment, the server 4 selects a work machine having a communication function and a display function which is appropriate for the additional work and transmits the additional work information to the selected manual work machine 3.

Thereby, according to the present embodiment, similarly to the first embodiment, it is possible to reduce the risk of leaving work left behind by the autonomous work machine 2 as it is.

According to the present embodiment, similarly to the first embodiment, the worker can know in which area (location) the work left undone by the autonomous work machine 2 is, and can further know an optimum manual work machine 3 for the work. As a result, according to the present embodiment, it is possible to perform work efficiently.

In the embodiments and the modification examples described above, although an example in which the autonomous work machine 2 is a lawn mower has been described, the present invention is not limited thereto. The autonomous work machine 2 may be a self-propelled mower, a self-propelled blower (a device for returning the mowed grass into the ground), or the like.

The autonomous work machine 2 may be a device that works a predetermined area using a plurality of work machines. For example, the autonomous work machine 2 may be a self-propelled cleaning robot, may be a self-propelled transport device within a factory, may be a self-propelled monitoring device, or the like. In this case, the detection unit 202 includes a sensor capable of detecting work left undone according to coordinates.

A program for realizing all or some of functions of the autonomous work machine 2 in the present invention is recorded in a computer readable recording medium, and thus all or some of processes performed by the autonomous work machine 2 may be performed by causing a computer system to read and execute the program recorded in this recording medium. The term "computer system" referred to here is assumed to include an OS and hardware such as peripheral devices. The "computer system" is also assumed to include a WWW system provided with a homepage providing environment (or a display environment). The term "computer readable recording medium" refers to a flexible disk, a magneto-optic disc, a ROM, a portable medium such as a CD-ROM, and a storage device such as a hard disk built into the computer system. Further, the "computer readable recording medium" is assumed to include recording mediums that hold a program for a certain period of time like a volatile memory (RAM) inside a computer system serving as a server or a client in a case where a program is transmitted through networks such as the Internet or communication lines such as a telephone line.

The above-mentioned program may be transmitted from a computer system having this program stored in a storage device or the like through a transmission medium or through transmitted waves in the transmission medium to other computer systems. Here, the "transmission medium" that transmits a program refers to a medium having a function of transmitting information like networks (communication networks) such as the Internet or communication channels (communication lines) such as a telephone line. The above-mentioned program may realize a portion of the above-mentioned functions. Further, the program may be a so-called difference file (difference program) capable of realizing the above-mentioned functions by a combination with a program which is already recorded in a computer system.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An autonomous work system comprising:
a first work machine configured to have a first communication unit, the first work machine being an autonomous work machine;
a plurality of second work machines having different functions configured to have second communication units, the plurality of second work machines being manual work machines;
a setting device configured to store work schedule information indicating work schedule content, performance of the first work machine, and performance of the plurality of second work machines and to have a third communication unit; and
a terminal configured to have a fourth communication unit and a notification unit,
wherein the first work machine acquires a state of work performed by its own device and transmits detection result information indicating the acquired state of work to the setting device, and
the setting device
discriminates whether additional work is required on the basis of the detection result information received from the first work machine and the work schedule information, and
in a case where the additional work is required, selects the second work machine appropriate for the additional work from the plurality of second work machines on the basis of the performance of the plurality of second work machines, and transmits additional work information including work content for the second work machine and information relating to the selected second work machine to at least one of the terminal and the second work machine.

2. An autonomous work system comprising:
a first work machine configured to store work schedule information indicating work schedule content, performance of its own device, and performance of a plurality of second work machines and to have a first communication unit, the first work machine being an autonomous work machine;
the plurality of second work machines configured to have respective second communication units, the plurality of second work machines being manual work machines;
a second work machine of the plurality of second work machines, the second work machine configured to have a second communication unit of the respective second communication units;
a setting device configured to have a third communication unit; and
a terminal configured to have a fourth communication unit and a notification unit,
wherein the first work machine
acquires a state of work performed by its own device and discriminates whether additional work is required on the basis of detection result information indicating the acquired state of work and the work schedule information, and
in a case where the additional work is required, selects the second work machine appropriate for the additional work from the plurality of second work machines on the basis of the performance of the plurality of second work machines, and transmits additional work information including work content for the second work machine and information relating to the selected second work machine to the setting device, and
the setting device transmits the received additional work information to at least one of the terminal and the second work machine.

3. An autonomous work system comprising:
a first work machine configured to store work schedule information indicating work schedule content, performance of its own device, and performance of a plurality of second work machines and to have a first communication unit, the first work machine being an autonomous work machine;
the plurality of second work machines configured to have respective second communication units, the plurality of second work machines being manual work machines;
a second work machine of the plurality of second work machines, the second work machine configured to have a second communication unit of the respective second communication units, the first work machine being an autonomous work machine;
a terminal configured to have a third communication unit and a notification unit,
wherein the first work machine
acquires a state of work performed by its own device and discriminates whether additional work is required on the basis of detection result information indicating the acquired state of work and the work schedule information, and
in a case where the additional work is required, selects the second work machine appropriate for the additional work from the plurality of second work machines on the basis of the performance of the plurality of second work machines, and transmits additional work information including work content for the second work machine and information relating to the selected second work machine to at least one of the terminal and the second work machine.

4. The autonomous work system according to claim 1, wherein the first work machine and the setting device share the work schedule information, and
the first work machine acquires at least one of content of completed work and content of work that has not been performed with respect to the work schedule information on the basis of the work schedule information and the detection result information.

5. An autonomous work setting method in an autonomous work system including a first work machine configured to have a first communication unit, the first work machine being an autonomous work machine, a plurality of second work machines having different functions configured to have second communication units, the plurality of second work machines being manual work machines, a setting device configured to have a third communication unit, and a terminal configured to have a fourth communication unit, the method comprising:
acquiring detection result information indicating a state of work performed by the first work machine from the first work machine;
discriminating whether additional work is required on the basis of work schedule information indicating work schedule content and the acquired detection result information;
selecting the second work machine appropriate for the additional work from the plurality of second work machines on the basis of performance of the plurality of second work machines in a case where the additional work is required; and
transmitting additional work information including work content for the second work machine and information relating to the selected second work machine to at least one of the terminal and the second work machine.

6. A computer-readable non-transitory storage medium storing a program causing a computer to:
acquire detection result information indicating a state of work performed by a first work machine from the first work machine the first work machine being an autonomous work machine;
discriminate whether additional work is required on the basis of work schedule information indicating work schedule content and the acquired detection result information;
select the second work machine appropriate for the additional work from a plurality of second work machines on the basis of performance of the plurality of second work machines in a case where the additional work is required, the plurality of second work machines being manual work machines; and
transmit additional work information including work content for the second work machine and information relating to the selected second work machine to at least one of a terminal having a communication unit and the second work machine.

\* \* \* \* \*